UNITED STATES PATENT OFFICE.

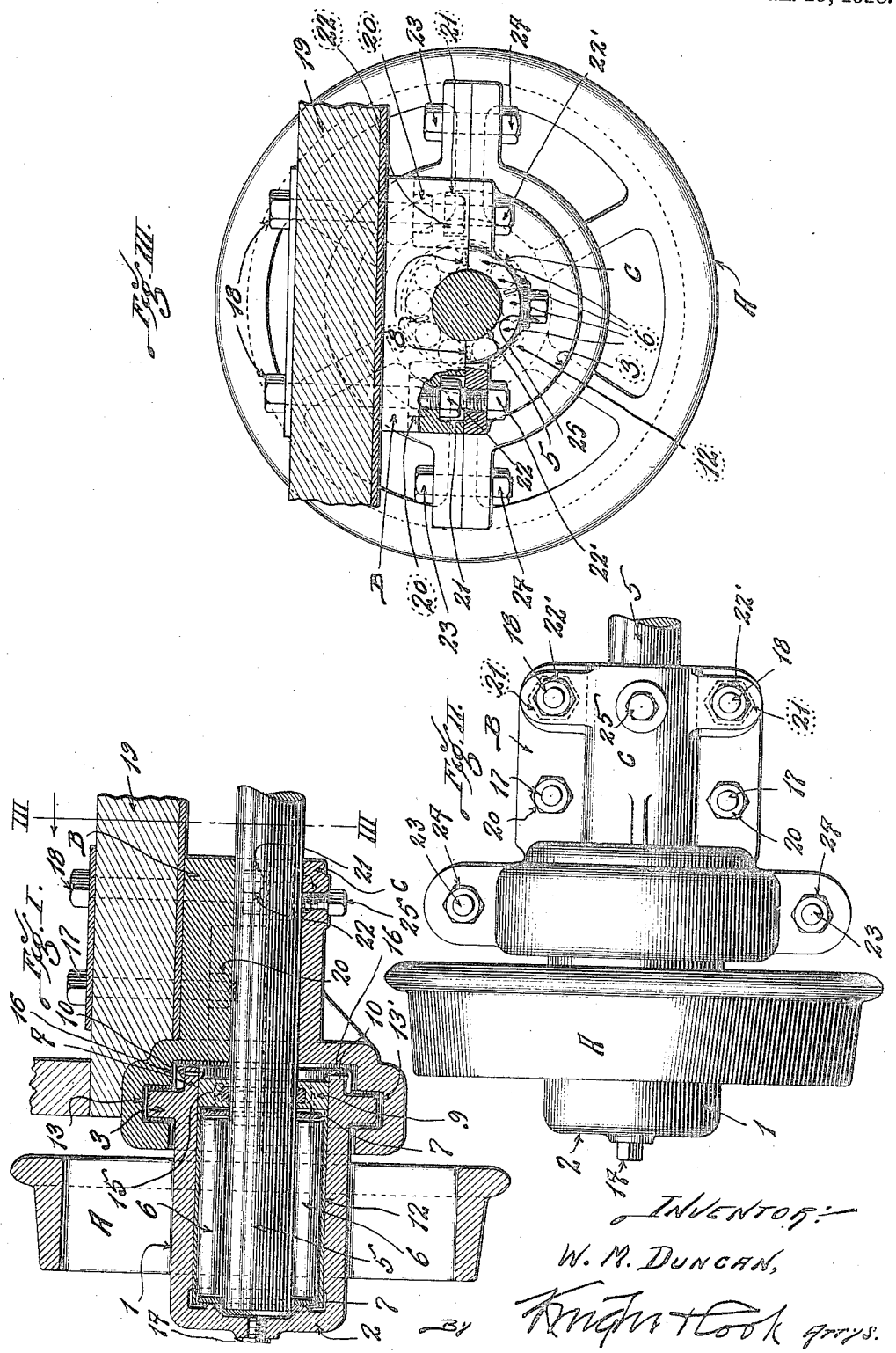

WILLIAM M. DUNCAN, OF ALTON, ILLINOIS.

CAR-WHEEL.

1,253,478.

Specification of Letters Patent.

Patented Jan. 15, 1918.

Application filed May 4, 1916. Serial No. 95,347.

*To all whom it may concern:*

Be it known that I, WILLIAM M. DUNCAN, a citizen of the United States of America, a resident of Alton, in the county of Madison, State of Illinois, have invented certain new and useful Improvements in Car-Wheels, of which the following is a full, clear, and exact description, reference being had to the accompanying drawings, forming a part of this specification.

My invention relates to improvements in car wheels and bearings therefor, one of the objects being to produce a strong and simple means for securing a car wheel to a car. Another object is to prevent the escape of lubricant from the wheel. A further object is to produce a wheel having an anti-friction bearing and a retainer associated therewith to prevent the bearing from engaging the non-rotatable elements of the structure.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a vertical section illustrating a portion of a mine car equipped with a wheel and wheel holding device embodying the features of the invention.

Fig. II is an inverted plan view of the wheel and wheel holding device shown in Fig. I.

Fig. III is a vertical section on line III—III, Fig. I.

A designates a wheel provided with a hub 1, the latter being closed by a web 2 at the outer side of the wheel. An annular thrust flange 3 extends from the periphery of the hub 1 at the inner side of the wheel, and the hub is provided with an inner extension 4 which extends inwardly from said flange 3.

An anti-friction bearing device, located between the hub 1 and the journal 5, preferably comprises a series of rollers 6 arranged between the cage rings 7, and cage bars 8 connected to said cage rings. The cage bars 8 are parallel with the rollers and the cage rings 7 surround the journal 5 at the ends of the rollers. To prevent the anti-friction device from engaging non-rotating parts of the structure, a retaining ring 9 is arranged in the hub at the inner end of the anti-friction device, as shown in Fig. I. This ring is adapted to rotate with the hub and anti-friction device to prevent the latter from being impaired by rubbing against a non-rotating element. 10 designates rivets passing through the extension 4 of the hub at points adjacent to the retaining ring 9 so as to detachably secure said ring in the hub. In removing the anti-friction bearing from the hub, the rivets 10 are punched from the hub to permit the removal of the retaining ring 9. A bearing sleeve or lining 12 is preferably secured to the inner face of the hub.

The wheel holder comprises an upper section B and a lower section C, embracing the thrust flange 3 near the inner end of the hub. A semi-circular groove 13 formed in the upper section B, registers with a similar groove 13′ in the lower section C, so as to form an annular groove for the reception of the thrust flange 3. The opposing side walls of this annular groove are located adjacent to the opposite side faces of the thrust flange 3, so that the lateral thrusts transmitted to the structure will be delivered directly to the thrust flange 3 instead of to the journal or the end faces of the hub.

A lubricant receiving opening, at the outer end of the hub, is normally closed by a plug 14 which may be readily removed to provide for the introduction of grease or the like into the hub. A packing ring 15 is fitted to the journal 5 and retaining ring 9 to retard the flow of lubricant from the hub. It is to be understood, however, that some of the lubricant will escape from the hub and flow into the sections B and C of the wheel holding device. Each of these sections is provided with a semi-circular pocket 16 (Fig. I) for the reception of the extension 4 at the inner end of the hub, and it will be apparent that the lubricant escaping from the hub must flow into one of the pockets 16, around the hub extension 4, into the annular groove 13—13′, and around the thrust flange 3 before it can escape from the wheel holder. By retarding the flow of lubricant in this manner the thrust flange 3 will receive a sufficient supply of lubricant, and very little, if any, of the lubricant will escape from the structure.

The means for securing the upper section of the wheel holder to the car comprises pairs of bolts 17 and 18 passing through the bottom 19 of the car. Nuts 20, engaging flanges at opposite sides of the upper section B, are fitted to the lower ends of the bolts 17. The bottom faces of the upper section B is provided with a pair of non-circular pockets 21 for the reception of upper nuts 22, the latter being fitted to the bolts 18 at points above the lower ends of said bolts to secure the upper section B to the car. The upper nuts 22 are prevented from turning by the walls of the non-circular pockets 21, but the bolts 18 may be turned by applying a wrench to their upper ends.

The means for securing the lower section C to the upper section B, comprises lower nuts 22' fitted to the lower ends of bolts 18 and bearing against the bottom faces of ears or flanges which extend laterally from the lower section C. The upper and lower sections are also connected together by means of short bolts 23 passing through bolt receiving ears at the meeting edges of the sections and provided with nuts 24 at their lower ends.

The lower section C of the wheel holding device may be readily removed by unscrewing the nuts 22' and 24, thereby disconnecting the lower section C from the upper section B. This allows the lower section to be removed without disturbing the nuts 20 and 22 which secure the upper section to the car.

25 designates a set screw securing the journal to the sectional wheel holder.

I claim:—

1. In a structure of the character described, a car wheel having a hub provided with a peripheral flange at the inner side of the wheel, a wheel holder comprising an upper section and a lower section each having a semi-circular pocket for the reception of said peripheral flange, a journal extending from said wheel holder and into the hub, and means for securing said wheel holder to the car, said means including bolts passing through said upper and lower sections and each of said bolts being provided with an upper nut for securing the upper section to the car and a lower nut for securing said lower section to said upper section.

2. In a structure of the character described, a car wheel having a hub, a wheel holder comprising an upper section and a lower section interlocked with said hub and adapted to be separated from each other to permit the removal of the wheel from the wheel holder, a journal extending from said wheel holder and into said hub, and means for securing said wheel holder to a car, said means including bolts passing through both of said sections, non-circular upper nuts fitted to said bolts at points remote from the lower ends of the bolts so as to secure the upper section to the car, the bottom of said upper section being provided with non-circular pockets for the reception of said non-circular upper nuts, and lower nuts fitted to the lower ends of said bolts to secure the lower section to the upper section.

WILLIAM M. DUNCAN.

Copies of this patent may be obtained for five cents each, by addressing the "Commissioner of Patents, Washington, D. C."